United States Patent
Freienstein et al.

(10) Patent No.: US 11,269,339 B2
(45) Date of Patent: Mar. 8, 2022

(54) METHOD AND CONTROL UNIT FOR CONTROLLING A VEHICLE DURING A COLLISION

(71) Applicant: Robert Bosch GmbH, Stuttgart (DE)

(72) Inventors: Heiko Freienstein, Weil der Stadt (DE); Johannes Ludwig Foltin, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 194 days.

(21) Appl. No.: 16/624,413

(22) PCT Filed: Apr. 11, 2018

(86) PCT No.: PCT/EP2018/059267
§ 371 (c)(1),
(2) Date: Dec. 19, 2019

(87) PCT Pub. No.: WO2018/233892
PCT Pub. Date: Dec. 27, 2018

(65) Prior Publication Data
US 2020/0218267 A1    Jul. 9, 2020

(30) Foreign Application Priority Data
Jun. 20, 2017 (DE) .......................... 102017210300.0

(51) Int. Cl.
*G05D 1/02* (2020.01)
*B62D 15/02* (2006.01)
*B60W 30/085* (2012.01)

(52) U.S. Cl.
CPC ......... *G05D 1/0214* (2013.01); *B60W 30/085* (2013.01); *B62D 15/025* (2013.01);
(Continued)

(58) Field of Classification Search
CPC ......... G05D 1/0214; G05D 2201/0212; G05D 2201/0213; B60W 30/085; B62D 15/025; B62D 15/0265
(Continued)

(56) References Cited

U.S. PATENT DOCUMENTS

| | | | |
|---|---|---|---|
| 2015/0019063 A1* | 1/2015 | Lu | B60K 28/14 701/25 |
| 2016/0280266 A1 | 9/2016 | Kawamata | |
| 2018/0015918 A1* | 1/2018 | Bae | B60W 50/16 |

FOREIGN PATENT DOCUMENTS

| | | |
|---|---|---|
| CN | 101407201 A | 4/2009 |
| DE | 102008000783 A1 | 9/2009 |

(Continued)

OTHER PUBLICATIONS

English Translation: Fritsch, DE 102015014413 A1, May 12, 2016, German Patent Office Patent Publication (Year: 2016).*
(Continued)

*Primary Examiner* — Nadeem Odeh
(74) *Attorney, Agent, or Firm* — Norton Rose Fulbright US LLP; Gerard Messina

(57) ABSTRACT

A method for controlling an ego vehicle during a collision of the vehicle with another vehicle includes an ascertainment of a driving direction of the other vehicle, a determination of a steering signal for aligning a driving direction of the ego vehicle with the driving direction of the other vehicle and a provision of the steering signal to an interface of a steering unit for steering the ego vehicle.

11 Claims, 4 Drawing Sheets

(52) U.S. Cl.
CPC ............... *G05D 2201/0212* (2013.01); *G05D 2201/0213* (2013.01)

(58) Field of Classification Search
USPC .......................................................... 701/23
See application file for complete search history.

(56) References Cited

FOREIGN PATENT DOCUMENTS

| | | | | |
|---|---|---|---|---|
| DE | 202013006010 U1 | * | 10/2014 | ......... B62D 15/0265 |
| DE | 202013006010 U1 | | 10/2014 | |
| DE | 102015014413 A1 | * | 5/2016 | ................ B60T 7/12 |
| JP | 2007125997 A | * | 5/2007 | |

OTHER PUBLICATIONS

English Translation: GM Global Technology Operations LLC, DE 202013006010 U1, Oct. 2014, German Patent Office Patent Publication (Year: 2014).*

English Translation: Sugimoto, JP 2007125997 A, May 2007, Japanese Patent Office Patent Publication (Year: 2007).*

International Search Report dated Jul. 9, 2018 of the corresponding International Application PCT/EP2018/059267 filed Apr. 11, 2018.

\* cited by examiner

METHOD AND CONTROL UNIT FOR CONTROLLING A VEHICLE DURING A COLLISION

CROSS-REFERENCE TO RELATED APPLICATIONS

The present application is the national stage of International Pat. App. No. PCT/EP2018/059267 filed Apr. 11, 2018, and claims priority under 35 U.S.C. § 119 to DE 10 2017 210 300.0, filed in the Federal Republic of Germany on Jun. 20, 2017, the content of each of which are incorporated herein by reference in their entireties.

FIELD OF THE INVENTION

The present invention is directed to a device or to a method for controlling a vehicle during a collision.

BACKGROUND

More and more sensors are installed in vehicles for convenience functions that can also be utilized for predicting an accident. In automated driving, a particularly large number of sensors are installed, since the driver is relieved of the task of driving. As a result, it is possible to also carry out major interventions in the longitudinal/transverse regulation that are not so easily possible in the case of an assistance system. A highway pilot can become involved in accidents even at a great safety distance, for example, if a careless driver swerves and is seen too late by the automated vehicle.

SUMMARY

Against this background, a method for controlling a vehicle during a collision, in addition a control unit that uses this method and, finally, a corresponding computer program are presented with the approach presented herein.

With the method presented herein, it is advantageously possible to optimize an impact during a collision of two vehicles in such a way that the accident event is positively influenced. For this purpose, a driving direction of the host vehicle, referred to hereinafter as ego vehicle, can be adapted to a position and orientation of another vehicle with which the ego vehicle will likely collide. By adapting the driving direction of the two vehicles, it is possible to keep them stable during the collision, whereby rotational movements, in particular, can be avoided. This approach is suited both for semi-automated as well as for automated driving. On the whole, it is possible with the approach described herein to achieve a full-contact crash for stabilizing the overall accident situation. For this purpose, an adaptation of the position and driving direction of the ego vehicle to the other vehicle can be carried out in order to keep the other vehicle stable during the accident.

According to an example embodiment, a method for controlling an ego vehicle during a collision of the vehicle with another vehicle includes the following steps: ascertaining a driving direction of the other vehicle; determining a steering signal for aligning a driving direction of the ego vehicle with the driving direction of the other vehicle; and providing the steering signal to an interface of a steering unit for steering the ego vehicle.

The ego vehicle can, for example, be a vehicle for transporting passengers. The collision can take place during the drive of the vehicle on a road. During the collision, the ego vehicle can rear-end the other vehicle. The steering unit can be suited for controlling the driving direction of the ego vehicle, for example, by changing the steering angle of the front wheels of the ego vehicle and/or by decelerating one or multiple wheels, preferably on one side. The steering signal can include a steering angle value, with which an instantaneous steering angle can be changed in such a way that the driving direction of the ego vehicle is aligned with the driving direction of the other vehicle. The steering signal can be used to change the vehicle orientation by adjusting the orientation of the wheels, as well as via asymmetrical braking actions, for example, one-sided braking as utilized in ESC-/ESP systems. Thus, a (classic) steering and/or braking can be used for influencing the orientation. According to an example embodiment, the driving directions of the vehicles can be aligned to each other to the extent that the driving directions coincide. In this way, the ego vehicle and/or the other vehicle can if possible only experience a longitudinal acceleration as a result of the crash that can be absorbed simply by decelerating. The driving direction of the other vehicle can be ascertained using a suitable method. For example, a value defining the driving direction of the other vehicle can be received via a car-to-car communication or ascertained using a sensor system of the ego vehicle.

The ego vehicle can be a vehicle driving in an automated manner. In the case of automated driving, it is generally assumed that it is an accident-free driving. The exact behavior in the event of an accident is therefore not yet fully defined. In accident situations, an emergency braking can be initiated, for example that can result in small overlaps of the colliding vehicles as a function of the traffic situation. A small overlap between two vehicles colliding with each other can result in instabilities. With the approach described herein, it is possible to avoid such instabilities so that damage to the vehicle, occupants, and infrastructure, in particular, on the highway at high speed resulting from rotational movements difficult to control, can be avoided.

For this purpose, the driving direction of the other vehicle can be ascertained using at least one sensor signal of a surroundings sensor unit of the ego vehicle. The surroundings sensor unit can include one or multiple surroundings sensors. A surroundings sensor, for example, a camera or a radar sensor, is designed to detect the surroundings of the vehicle. By suitably evaluating the at least one sensor signal, it is possible to ascertain the other vehicle and the driving direction of the other vehicle. In this way, the driving direction of the other vehicle can be advantageously ascertained by using only devices of the ego vehicle.

According to an example embodiment, the method includes a step of ascertaining an instantaneous degree of overlap between the ego vehicle and the other vehicle. In the step of determining, the steering signal can be determined in order to increase the degree of overlap. The driving direction of the ego vehicle can be advantageously adapted to the other vehicle before the accident in such a way that during the collision a preferably large overlap exists between the ego vehicle and the other vehicle. In the step of determining, the steering signal can be determined in such a way that the degree of overlap is increased. As a result of the large overlap, the forces occurring during the collision can be transferred over a large area and extensive but minimal deformations can result. In addition to the improved occupant protection, the likelihood of the vehicles interlocking is reduced. An interlocking of the vehicles can result in the vehicles becoming linked, the resultant vehicle complex possibly becoming unstable. A large accident surface area also offers the advantage that the likelihood of an unintentional turning of the other vehicle is reduced.

According to an example embodiment, it is advantageously possible to ascertain a point of rotation of the other vehicle. In this case, the steering signal can be determined in order to allow a vector of a force applied by the ego vehicle to the other vehicle during the collision to pass through the point of rotation of the other vehicle. This process is meaningful, in particular, in a more complex accident scenario. In this case, the center of gravity or the point of rotation of the other vehicle can be estimated and the ego vehicle can be oriented in such a way that a rotational movement of the other vehicle preferably does not occur. Other more complex calculations are also conceivable in order to keep the accident opponent stable.

According to an example embodiment, the method can include a step of determining a brake signal for decelerating the ego vehicle. In a step of providing, the brake signal can be provided to an interface of a braking unit for decelerating the ego vehicle. The braking unit can be understood to mean a braking system. With the brake signal, it is possible to activate the braking unit in order to effectuate a braking of the ego vehicle that is executed as forcefully as possible. In this way, as much energy as possible can be reduced before the collision so that in the in-crash-phase, i.e., at the moment of the collision, preferably little energy is transferred.

The method can include a step of ascertaining the orientation of the ego vehicle relative to a traffic lane after the collision. The step of ascertaining the orientation can be carried out after the collision. In the step of determining the steering signal, an additional steering signal can be determined for orienting the ego vehicle in the traffic lane. Since the ego vehicle was oriented differently for optimizing the accident, i.e., slightly angled, than before entering the critical situation, the ego vehicle is placed in a safe position after the impact. In addition to the re-orientation in the lane, the speed is reduced according to an example embodiment.

The method can include a step of ascertaining an impulse value that represents an impulse exchanged during the collision between the ego vehicle and the other vehicle. The step of determining the steering signal can be carried out if the impulse value is above an impulse threshold value. In this way, it is possible to take both a weight as well as a speed of the other vehicle into account when deciding whether the orientation of the ego vehicle is adapted or not.

According to an example embodiment, the method includes a step of ascertaining a weight value that reflects a weight of the other vehicle. The step of determining the steering signal can be carried out if the weight value is lower than a weight threshold value. The weight value can be ascertained, for example, by reading out a value stored for a vehicle type of the other vehicle, or by measuring or estimating, for example, a volume of the other vehicle.

The orientation of the ego vehicle can be adapted, for example, if the weight of the other vehicle is lower than a threshold, so that there is steering even in the case of other vehicles that are somewhat heavier than the ego vehicle. The threshold can, for example, be equal to the ego weight of the ego vehicle, can correspond to a factor of the ego weight (generally >1) and/or can reflect a weight offset. Thus, the threshold according to an example embodiment can correspond approximately to the weight of the ego vehicle. According to an example embodiment, the exact weight is not necessarily required as a threshold, but an approximate value is sufficient that can also be somewhat above the vehicle weight of the ego vehicle and, for example, can be derived from one vehicle class. The impulse experienced by the other vehicle is decisive. The heavier the ego vehicle is compared to the other vehicle, the greater the impulse received by the opposing vehicle.

In an example embodiment, the weight value is alternatively not ascertained or is not sufficiently precisely ascertained by the surroundings sensor system. If a constant weight value is utilized for ascertaining the impulse value, then the relative speed is the variable portion that impacts the impulse value. Thus, it is also possible to utilize exclusively the relative speed instead of the impulse value and to check it against a threshold for the relative speed, instead of ascertaining an impulse value. By checking the relative speed at a constantly assumed mass, it is possible to particularly easily carry out the calculation, as a result of which resources can be saved.

In an example embodiment, a check of the accuracy with which an impulse value can be ascertained and/or the accuracy with which the orientation can be carried out, is carried out before an adaptation of the orientation. In this case, it is possible, for example, to include surroundings sensor data and attainable positional accuracies that can include a friction value of the road. If at least one accuracy is lower than a threshold, then an emergency braking, an emergency evasive maneuver or another emergency maneuver with a potential collision requiring a reduced accuracy can be preferably carried out. In this way, an acceptable behavior intended to preferably soundly protect the persons involved in the accident can be achieved, even in the case of insufficiently high accuracy.

In an example embodiment, the method is carried out as a function of the other vehicle. In this case, a weight of the other vehicle can be ascertained with a step of ascertaining. The step of determining the steering signal can be carried out if the weight of the other vehicle is lower than or equal to a weight of the ego vehicle. In the case of a lighter other vehicle, for example, a small vehicle or a motorcycle, the other vehicle can be easily placed in an unstable driving situation. The approach described herein can therefore be applied, in particular, in the case of lighter other vehicles, but also, for example, in the case of other vehicles of the host vehicle class.

According to an example embodiment, the method presented herein can be part of an assistance system that is capable of being overridden by the driver of the ego-vehicle. In such a case, the interventions effectuated by the method described can be significantly reduced. As a result, only a small re-orientation of the ego vehicle is possible that nevertheless can entail an advantage in some cases in the overall accident event. Thus, the use of the approach described is limited however not only to pilot systems of automated driving.

This method can, for example, be implemented in software or in hardware or in a mixed form of software and hardware, for example, in a control unit.

The approach presented herein also provides a control unit that is designed to carry out, activate, or implement the steps of a method as described herein in corresponding devices. With this embodiment in the form of a control unit as well, it is possible to easily and efficiently achieve the object underlying the present invention.

Such a control unit includes an ascertainment device that is designed to ascertain a driving direction of the other vehicle, a determination device that is designed to determine a signal for aligning a driving direction of the ego vehicle with the driving direction of the other vehicle, and a provision device that is designed to provide the steering signal to an interface of a steering unit for steering the ego vehicle.

A control device can be understood in the present case to be an electrical device that processes sensor signals and, as a function thereof, outputs control signals and/or data signals. The device can include an interface that can be designed in hardware and/or in software. In a hardware design, the interfaces can, for example, be part of a so-called system ASIC that contains a wide variety of functions of the device. It is also possible, however, for the interfaces to be dedicated integrated circuits or to be made at least partly of discrete components. In a software design, the interfaces can be software modules that are present, for example, on a microcontroller alongside other software modules.

For this purpose, the control unit can include at least one processing unit for processing signals or data, at least one memory unit for storing signals or data, at least one interface to a sensor or to an actuator for reading in sensor signals from the sensor or for outputting control signals to the actuator, and/or at least one communication interface for reading in or outputting data that are embedded in a communication protocol. The processing unit can, for example, be a signal processor, a microcontroller or the like, whereby the memory unit can be a flash memory, an EEPROM, or a magnetic memory unit. The communication interface can be designed to read in or output data in a wireless or hardwired manner, a communication interface that can read in or output hardwired data being capable of reading in these data, for example, electrically or optically from a corresponding data transmission line or outputting these data into a corresponding data transmission line.

An example embodiment of the present invention is directed to a computer program product or computer program having program code that can be stored on a machine-readable medium or memory medium, such as a semiconductor memory, a hard disk memory, or an optical memory, and which is used for carrying out, implementing, and/or controlling the steps of a method as described herein, in particular, when the program product or program is executed on a computer or on a device.

Example embodiments of the approach presented herein are depicted in the drawings and explained in greater detail in the following description.

DETAILED DESCRIPTION

Figure 1:
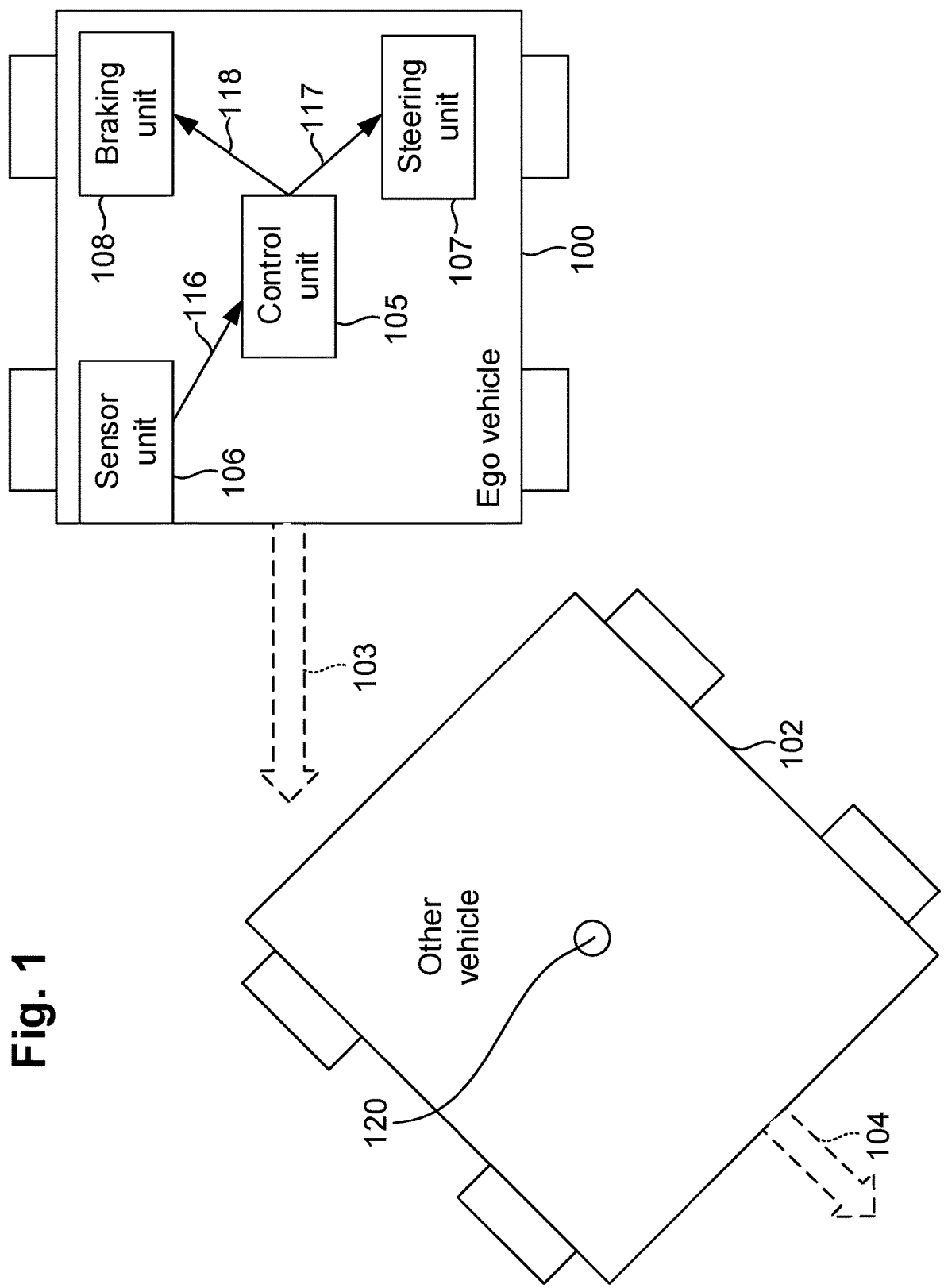
FIG. 1 is a block diagram of an ego vehicle and of another vehicle including devices of a method for controlling a vehicle during a collision according to an example embodiment of the present invention.

In the following description of preferred example embodiments of the present invention, identical or similar reference numerals are used for elements that are represented in the various figures and act similarly, a repeated description of these elements being omitted.

FIG. 1 shows an ego vehicle 100 according to an example embodiment. Also depicted is another vehicle 102 as well as a driving direction 103 of ego vehicle 100 and a driving direction 104 of other vehicle 102. In the scenario shown, vehicles 100, 102 are about to collide.

Ego vehicle 100 includes a control unit 105, a surroundings sensor unit 106, a steering unit 107 as well as a braking unit 108. Surroundings sensor unit 106 and control unit 105 are coupled via an interface for transmitting at least one sensor signal 116 from surroundings sensor unit 106 to control unit 105 of ego vehicle 100. Control unit 105 is designed to provide a steering signal 117 to steering unit 107 and optionally a brake signal 118 to braking unit 108 via an interface. Steering unit 107 is provided for steering ego vehicle 100. Steering unit 107 is designed to use a piece of steering information transmitted by steering signal 117 for adapting driving direction 103 of ego vehicle 100. For this purpose, steering unit 107 according to an example embodiment is coupled to steerable wheels of vehicle 100. Braking unit 108 is provided for decelerating ego vehicle 100. Braking unit 108 is designed to use a piece of braking information transmitted by brake signal 118 for decelerating ego vehicle 100.

Surroundings sensor unit 106 includes one or multiple surroundings sensors. A surroundings sensor is a camera, a radar sensor, a LIDAR sensor, or an ultrasonic sensor, for example. Surroundings sensor system 106 is designed to detect the surroundings of ego vehicle 100. According to the scenario shown, other vehicle 102 is located in a detection range of surroundings sensor unit 106, so that the at least one sensor signal 116 of other vehicle 102 is depicted.

Control unit 105 is designed to evaluate the at least one sensor signal 116 in order to obtain pieces of information about other vehicle 102. According to this example embodiment, control unit 105 is designed to ascertain at least one position and driving direction 104 of other vehicle 102. Control unit 105 is further designed to determine steering signal 117 and to provide it to the interface of steering unit 107 using driving direction 104 of other vehicle 102 and driving direction 103 of ego vehicle 100, in such a way that steering signal 117 effectuates a change in direction of ego vehicle 100, via which driving direction 103 of ego vehicle 100 is aligned with driving direction 104 of other vehicle 102.

According to an example embodiment, control unit 105 is designed to compare values representing driving directions 103, 104 with each other, in order to determine a deviation between driving directions 103, 104. Based on the deviation, control unit 105 is designed to determine steering signal 117 in such a way that the deviation is reduced and driving directions 103, 104 are thus aligned with each other.

In the scenario shown, vehicles 100, 102 exhibit a certain degree of overlap during the collision if vehicles 100, 102 maintain their driving directions 103, 104. According to an example embodiment, control unit 105 is designed to ascertain the instantaneous degree of overlap between ego vehicle 100 and other vehicle 102 and to use it to determine steering signal 117. For this purpose, control unit 105 is designed to determine steering signal 117 in such a way that driving direction 103 of ego vehicle 100 changes in a way via which the degree of overlap is increased. Thus, driving direction 103 of ego vehicle 100 on the one hand is changed in such a way that driving directions 103, 104 preferably coincide and on the other hand, is changed in such a way that the degree of overlap between the vehicles is increased.

During the collision, a force is applied by ego vehicle 100 to other vehicle 102. In order to avoid a rotation of other vehicle 102 due to the force application, it is advantageous if the vector of the force application extends through point of rotation 120 of other vehicle 102.

In this way, it is possible, for example, to achieve an offset of the other vehicle in the collision direction without rotation. According to an example embodiment, control unit 105 is designed to ascertain point of rotation 120 of other vehicle 102 using the at least one sensor signal 116 and to determine steering signal 117 in such a way that driving direction 103 of ego vehicle 100 changes in a way such that ego vehicle 100 strikes other vehicle 102 during the collision in such a way that the vector of the force application extends through point of rotation 120 of other vehicle 102.

The impact of the collision on vehicles 100, 102 is a function of the weights and relative speed of vehicles 100, 102. According to an example embodiment, control unit 105 is designed to determine the weight of other vehicle 102 using the at least one sensor signal 116 and, optionally, a database having stored weight values. According to an example embodiment, driving direction 103 of ego vehicle 100 is adapted only if the weight of other vehicle 102 is lower than or equal to the weight of ego vehicle 100. In this case, steering signal 117, for example, is determined or provided to steering unit 107 only if the weight of other vehicle 102 is lower than or equal to a weight of ego vehicle 100.

Weight and relative speed determine the impulse value that is exchanged between colliding vehicles 100, 102 during the collision. A rapid rear-end collision with another vehicle 102 of equal weight can have a similar impulse value for other vehicle 102 as a slow rear-end collision with a lighter other vehicle 102.

According to an example embodiment, driving direction 103 of ego vehicle 100 is adapted only when the relative speed of ego vehicle 100 and other vehicle 102 is greater than a previously determined value.

According to an example embodiment, driving direction 103 of ego vehicle 100 is adapted only when the impulse value is above a previously determined threshold.

According to an example embodiment, a weight value is utilized instead of the actual weight that can be ascertained, for example, from a volume and/or from a measurement of the proportion of steel in vehicle 102 or of the absorption characteristics, for example, of radar beams. Based on the volume, it is possible, for example, to ascertain the weight using an average density. By measuring the proportion of steel or the packing density of the elements in vehicle 102 via radar beams, it is possible to ascertain an average density value, making an even more precise ascertainment of the weight possible.

According to an example embodiment, control unit 105 is designed to provide brake signal 118 to braking unit 108 as soon as control unit 105 detects the imminent collision using the at least one sensor signal 116. According to an example embodiment, brake signal 118 is also provided after the collision has occurred.

With the change in direction carried out before the collision or due to the forces operating during the collision, ego vehicle 100 can depart its traffic lane. According to an example embodiment, ego vehicle 100 is designed to determine an instantaneous orientation of ego vehicle 100 relative to the traffic lane after the collision has occurred using the at least one sensor signal 116. If ego vehicle 100 is located outside the traffic lane or would depart the traffic lane if the driving direction were maintained, control unit 105 is designed to provide steering signal 117 in such a way that steering unit 107 is activated in such a way that ego vehicle 100 is guided back into the traffic lane or a departure from the traffic lane is prevented.

Figure 2:
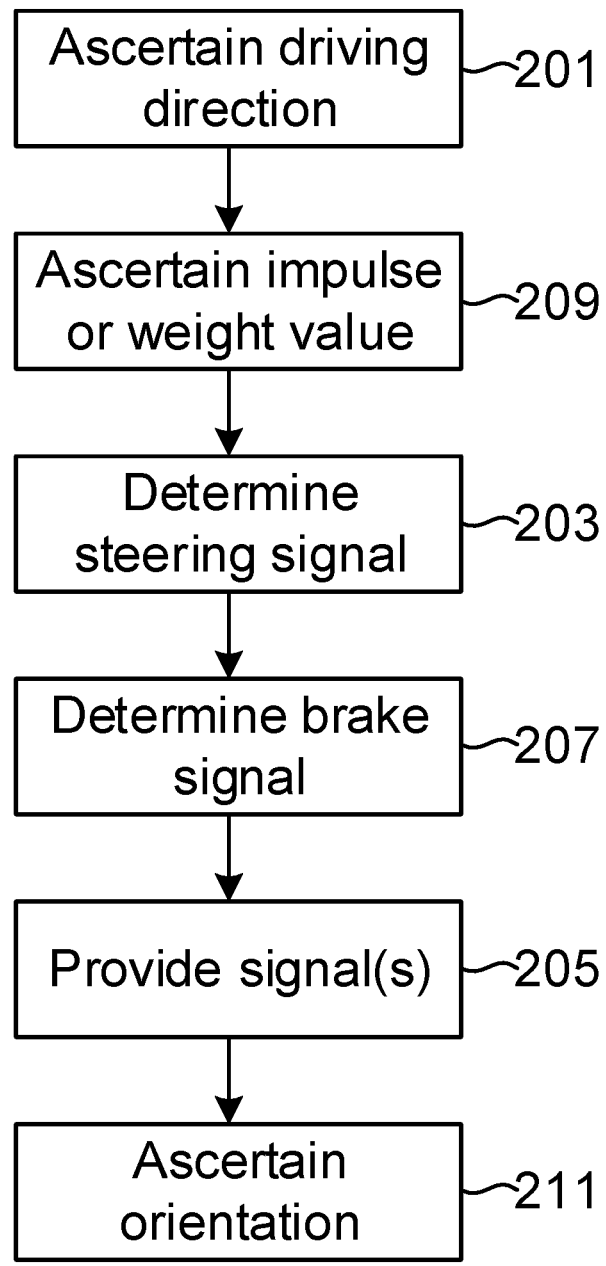
FIG. 2 is a flowchart of a method for controlling a vehicle during a collision according to an example embodiment of the present invention.

FIG. 2 is a flowchart of a method for controlling a vehicle during a collision according to an example embodiment. The vehicle can be the ego vehicle described with reference to FIG. 1 that will likely collide with the other vehicle.

In a step 201, the driving direction of the other vehicle is ascertained. In a step 203, a steering signal is then determined for aligning the driving direction of the ego vehicle with the driving direction of the other vehicle, and in a step 205, is provided to the interface of the steering unit of the ego vehicle. According to an example embodiment, the steering signal is determined in step 203 using at least one sensor signal of a surroundings sensor unit of the ego vehicle. The at least one sensor signal can map the surroundings of the ego vehicle and can be analyzed and evaluated by the control unit in order, for example, to also determine the speed of the other vehicle.

In step 201, an instantaneous degree of overlap between the ego vehicle and the other vehicle is optionally also ascertained. The degree of overlap is used according to an example embodiment in step 203 to determine the steering signal in such a way that the degree of overlap increases up to the collision.

Point of rotation 120 of other vehicle 102 is optionally also ascertained in step 201. In this case, the point of rotation of the other vehicle is estimated, for example, and used in step 203 to provide the steering signal in such a way that a vector of a force application of the ego vehicle on the other vehicle during the collision preferably extends through the point of rotation of the other vehicle. Consequently, the steering signal can be determined in step 203 in such a way that the ego vehicle is oriented in such a way that a potential rotational movement of the other vehicle during the collision does not occur.

In an optional step 207, a brake signal for decelerating the ego vehicle is determined. The brake signal can be provided in step 205 to an interface to a braking unit in order to decelerate the ego vehicle. The braking of the ego vehicle in this case is carried out as forcefully as possible so that preferably little energy is transferred at the moment of collision.

An impulse value, a weight value or a weight of the other vehicle is optionally ascertained in a step 209. In this case, for example, step 203 of determining the steering signal is carried out, for example, as a function of a result of a comparison of at least one of these values with a threshold value. The orientation of the ego vehicle is adapted, for example, only when the weight of the other vehicle corresponds approximately to a weight of the ego vehicle. In this case, the weight of the other vehicle according to an example embodiment can be up to 10% above the weight of the ego vehicle. The impulse value can be determined, for example, from the weight and from the relative speed, for example, as a product of weight and relative speed.

After the collision has occurred, an orientation of the ego vehicle relative to a traffic lane is optionally ascertained in a step 211. A piece of information about the orientation can be used during a repeated implementation of step 203 of determining the steering signal, in order to determine the steering signal in such a way that the ego vehicle is oriented in the traffic lane.

Steps 201, 203, 205, 207, 211 can be continuously carried out during the accident event, so that, for example, an updated steering signal is continuously provided to the steering unit.

According to an example embodiment, a center of gravity of the other vehicle is ascertained in step of ascertaining 201, and in step 203, the steering signal is determined in addition or alternatively using the center of gravity. Thus, a decision whether or not the orientation of the ego vehicle is adapted, can also be made if only the center of gravity is known. Based on the position of the center of gravity of the other vehicle, it is possible to determine a lateral offset between the other vehicle and the ego vehicle.

Figure 3:
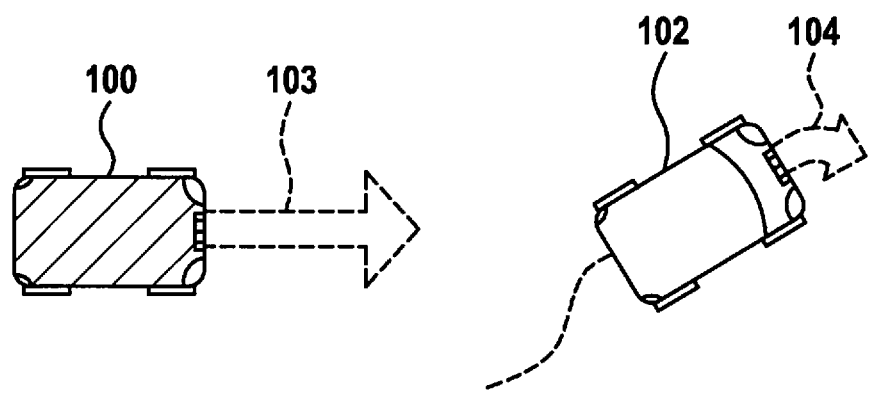
FIG. 3 shows an unavoidable accident scenario between an ego vehicle and another vehicle according to an example embodiment of the present invention.

FIG. 3 shows an unavoidable accident scenario between ego vehicle 100 and other vehicle 102 on a highway according to an example embodiment. The vehicles can, for example, be the vehicles described with reference to FIG. 1. Ego vehicle 100, in this case an automated vehicle, is driving at high speed. The careless driver of slow-driving other car 102 has incorrectly estimated the situation and changes to the lane of ego vehicle 100. The relative speed of the two is so great that ego vehicle 100 is unable to reduce the speed quickly enough in order to avoid a collision. An accident will occur between ego vehicle 100 and other vehicle 102.

Figure 4:
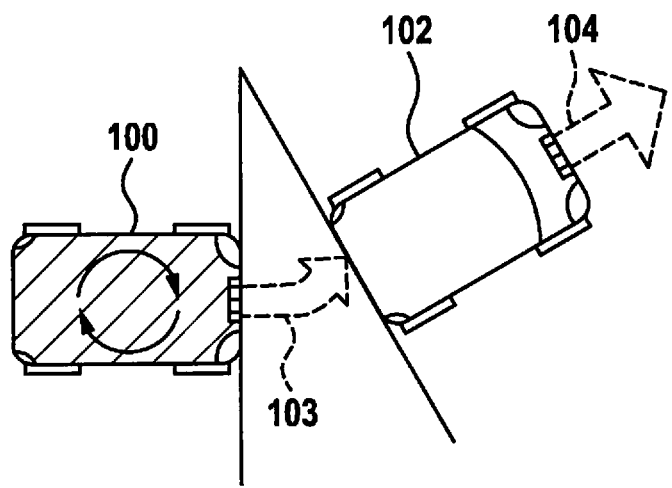
FIG. 4 shows representation of an ego vehicle and of another vehicle immediately before the mutual collision according to an example embodiment of the present invention.

FIG. 4 shows the behavior of ego vehicle 100 from FIG. 3 in the event of the accident with other vehicle 102 immediately before the accident (pre-crash) according to an example embodiment. The sensory system of ego vehicle 100 signals the unavoidable accident in the pre-crash phase. By measuring the movement of other vehicle 102, driving direction 104 is known or the driving direction at the time of impact can be estimated, for example, if other vehicle 102 describes a circular movement when swerving. The angle shown illustrates a deviation between instantaneous driving directions 103, 104 of vehicles 100, 102.

Ego vehicle 100 is adapted to the movement of other vehicle 102 by changing direction 103 in such a way that other vehicle 102 experiences primarily an impact in the longitudinal direction and such that preferably no additional acceleration in the transverse direction is added or no yaw movement is induced. In the simplest case, this can be achieved by both vehicles 100, 102 traveling in preferably the same direction at the point in time of the accident. The adaptation before the accident in this case takes place according to an example embodiment in such a way that during the collision a preferably large overlap occurs between ego vehicle 100 and other vehicle 102.

When ego vehicle 100 will unavoidably collide with other vehicle 102, ego vehicle 100 is oriented in such a way that other vehicle 102 experiences an impact directly from behind, i.e., rearward.

As a result, other vehicle 102 is merely longitudinally accelerated that can be easily absorbed by decelerating. A lateral acceleration is avoided, since this acceleration can cause other vehicle 102 to swerve.

Ego vehicle 100 is optionally also oriented in such a way that a preferably large overlap occurs. For this purpose, the adaption takes place before the accident in such a way that during the impact a preferably large overlap occurs between ego vehicle 100 and accident opponent 102 in order to obtain preferably few indentations of vehicle 100, 102 and to reduce the likelihood of an interlocking.

A full-surface covering also has the advantage that unintended turning and becoming unstable can be easily prevented, since the centers of gravity of vehicle 100, 102 and therefore also the points of rotation are superimposed in the driving direction and therefore also in the direction of impact. It becomes easier to keep vehicles 100, 102 stable.

The regulating concept underlying the approach described, in which the direction of impact corresponds to driving direction 104 of impacted vehicle 102 can have a limited range of validity in an example embodiment of the method. The limited range of validity can, for example, be defined by the relative approach speed and by the angle of other vehicle 102 relative to the road. The background is that an adaptation of the angle of impact is suppressed if other vehicle 102 were to be moved from the traffic lane by the impact.

In addition to the orientation of ego vehicle 100 and the attainment of a preferably high degree of overlap, vehicle 100 according to an example embodiment is decelerated as forcefully as possible in order to reduce a large amount of energy.

Heavier other vehicles 102, for example, if the host class is a small vehicle and the opponent is a heavier "Hummer," may not be so easily offset into an unstable state. In this case, therefore, an optimization other than the optimization described in the present approach can be utilized. For example, a maximum reduction of the ego speed and keeping ego vehicle 100 stable under all circumstances can be sought. Thus, it can, for example, be optimized on the host vehicle.

In an example embodiment, the present invention is not used in a system for automated driving on a highway, in a so-called highway pilot, but integrated as an assistance system. In this case, the interventions are drastically reduced so that, in principle, the driver of ego vehicle 100 is able to override the system. As a result, only a minimal re-orientation of ego vehicle 100 is possible that in some cases still provides an advantage in the overall accident event.

The approach described herein can, for example, be used in rear-end driving situations at a slightly oblique angle and, for example, only a 75% degree of overlap, in order to adapt the vehicle orientation of ego vehicle 100 in such a way that the relative angle is reduced and the degree of overlap is increased that can result in an improvement of the stability of the accident situation and in a reduction of secondary accidents.

Figure 5:
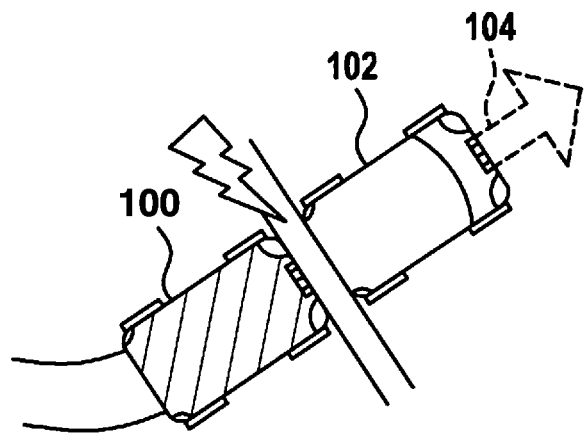
FIG. 5 shows a representation of an ego vehicle and of another vehicle at the moment of the mutual collision according to an example embodiment of the present invention.

FIG. 5 shows vehicles 100, 102 depicted in FIG. 4 during the impact (in-crash), i.e., at the moment of collision of both vehicles 100, 102. The driving direction of ego vehicle 100 has been adapted during the time up to the collision in such a way that it coincides with driving direction 104 of other vehicle 102. In addition, the position of ego vehicle 100 in relation to other vehicle 102 has been adapted in such a way that vehicles 100, 102 preferably completely overlap.

In the in-crash phase shown, other vehicle 102 and ego vehicle 100 experience a longitudinal acceleration that can be easily absorbed.

Since ego vehicle 100 was oriented differently for optimizing the accident, for example, at a slight angle in relation to a roadway, than before the critical situation occurred, for example, previously driving straight ahead, ego vehicle 100 is placed in a safe position again after the impact according to an example embodiment. In addition to the re-orientation in the lane, the speed of ego vehicle 100 is reduced, for example, by using a known function for reducing a time collision.

In an example embodiment, the approach described is carried out as a function of other vehicle 102. In the case of a weaker or lighter accident opponent, for example, a small vehicle or a motorcyclist, other vehicle 102 can easily be placed in an unstable driving situation. The approach described is therefore applied, in particular, in the case of such other vehicles 102, but also, for example, in the case of other vehicles 102 of the host vehicle class.

Figure 6:
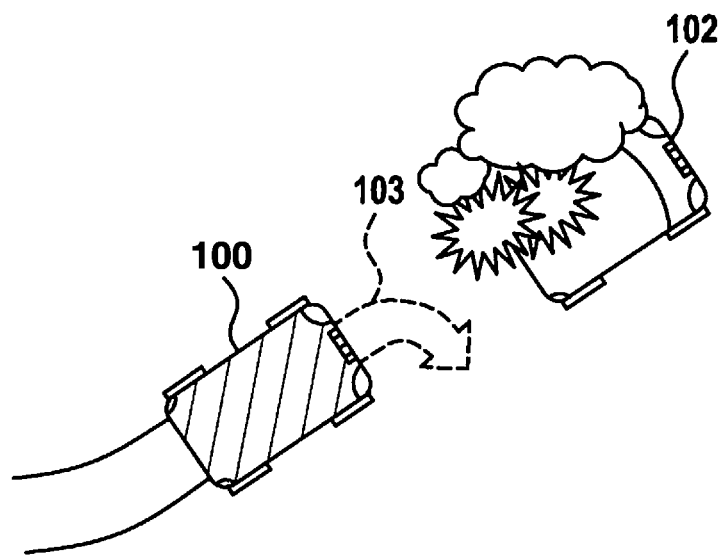
FIG. 6 shows a representation of an ego vehicle and of another vehicle immediately after the mutual collision according to an example embodiment.

FIG. 6 shows the behavior of ego vehicle 100 from FIG. 5 immediately after the collision (post-crash) with other vehicle 102. Since ego vehicle 100 was oriented differently for optimizing the accident, for example, at a slight angle, ego vehicle 100 is again placed in a safe position after the collision, i.e., ego vehicle 100 is re-oriented in the lane.

If an example embodiment includes an "and/or" linkage between a first feature and a second feature, this is to be read in the sense that the example embodiment according to an example embodiment includes both the first feature and the second feature, and according to another example embodiment, either only the first feature or only the second feature.

What is claimed is:

1. A method for controlling a first vehicle during a collision of the first vehicle with a second vehicle, the method comprising:
    ascertaining a driving direction of the second vehicle;
    determining a steering signal for aligning a driving direction of the first vehicle to the driving direction of the second vehicle;
    providing the steering signal to an interface of a steering unit for steering the first vehicle; and
    ascertaining a weight value that reflects a weight of the second vehicle, wherein the determining of the steering signal is carried out based on a determination that the weight value is lower than a weight threshold value;
    wherein instead of an actual weight of the second vehicle, the weight value is ascertained from at least one of an estimated volume of the second vehicle and a measurement of a proportion of steel in the second vehicle or of absorption characteristics of radar beams directed at the second vehicle, wherein the weight value is ascertained by at least one of using the volume and an average density and using an average density value that is ascertained by measuring the proportion of steel or a packing density of elements in the second vehicle via the radar beams, and
    wherein the first vehicle is an ego vehicle.

2. The method of claim 1, wherein the ascertainment of the driving direction of the second vehicle is based on at least one sensor signal of a surroundings sensor unit of the first vehicle.

3. The method of claim 1, wherein the ascertainment of the driving direction of the second vehicle includes determining an instantaneous degree of overlap between the first vehicle and the second vehicle, and the steering signal that is determined is one by which to increase the degree of overlap.

4. The method of claim 1, wherein the ascertainment of the driving direction of the second vehicle includes determining a point of rotation of the second vehicle, and the steering signal that is determined is one by which to allow a vector of a force application of the first vehicle on the second vehicle during the collision to pass through the point of rotation of the second vehicle.

5. The method of claim 1, further comprising:
    determining a brake signal for decelerating the first vehicle and providing the determined brake signal to an interface of a braking component for braking the first vehicle.

6. The method of claim 1, further comprising:
    ascertaining, after the collision, an orientation of the first vehicle relative to a traffic lane; and
    determining another steering signal for aligning the first vehicle in the traffic lane.

7. The method of claim 1, further comprising:
    ascertaining an impulse value that represents an impulse exchanged between the first vehicle and the second vehicle during the collision, wherein the determining the steering signal is carried out based on a determination that the impulse value is above an impulse threshold value.

8. The method of claim 1, wherein the method is executed by an assistance system of the first vehicle and is overridable by a driver of the first vehicle.

9. The method of claim 1, wherein an instantaneous orientation of the first vehicle relative to a traffic lane after the collision has occurred is determined using at least one sensor signal, and wherein when the first vehicle is located outside the traffic lane or would depart the traffic lane if the driving direction were maintained, an additional steering signal is provided so that the steering unit is activated to guide back the first vehicle into the traffic lane or to prevent a departure from the traffic lane.

10. A control unit, comprising:
    a processor for controlling a first vehicle during a collision of the first vehicle with a second vehicle, by performing the following:
    ascertaining a driving direction of the second vehicle;
        determining a steering signal for aligning a driving direction of the first vehicle to the driving direction of the second vehicle;
        providing the steering signal to an interface of a steering unit for steering the first vehicle; and
        ascertaining a weight value that reflects a weight of the second vehicle, wherein the determining of the steering signal is carried out based on a determination that the weight value is lower than a weight threshold value;
        wherein instead of an actual weight of the second vehicle, the weight value is ascertained from at least one of an estimated volume of the second vehicle and a measurement of a proportion of steel in the second vehicle or of absorption characteristics of radar beams directed at the second vehicle, wherein the weight value is ascertained by at least one of using the volume and an average density and using an average density value that is ascertained by measuring the proportion of steel or a packing density of elements in the second vehicle via the radar beams, and
        wherein the first vehicle is an ego vehicle.

11. A non-transitory computer-readable medium, on which are stored instructions that are executable by a processor, comprising:
    a program code arrangement having program code for controlling a first vehicle during a collision of the first vehicle with a second vehicle, by performing the following:
        ascertaining a driving direction of the second vehicle;
        determining a steering signal for aligning a driving direction of the first vehicle to the driving direction of the second vehicle;
        providing the steering signal to an interface of a steering unit for steering the first vehicle; and
        ascertaining a weight value that reflects a weight of the second vehicle, wherein the determining of the steering signal is carried out based on a determination that the weight value is lower than a weight threshold value;

wherein instead of an actual weight of the second vehicle, the weight value is ascertained from at least one of an estimated volume of the second vehicle and a measurement of a proportion of steel in the second vehicle or of absorption characteristics of radar beams directed at the second vehicle, wherein the weight value is ascertained by at least one of using the volume and an average density and using an average density value that is ascertained by measuring the proportion of steel or a packing density of elements in the second vehicle via the radar beams, and wherein the first vehicle is an ego vehicle.

* * * * *